(12) United States Patent
Kennedy et al.

(10) Patent No.: US 9,294,352 B1
(45) Date of Patent: Mar. 22, 2016

(54) NETWORK CHANGE MANAGEMENT

(71) Applicant: Amazon Technologies, Inc., Seattle, WA (US)

(72) Inventors: Robert Kennedy, Dublin (IE); Timothy R. Kohn, Seattle, WA (US); Devin Kowatch, Seattle, WA (US); Richard A. Sheehan, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/527,012

(22) Filed: Oct. 29, 2014

Related U.S. Application Data

(63) Continuation of application No. 13/586,819, filed on Aug. 15, 2012, now Pat. No. 8,880,690.

(51) Int. Cl.
*G06F 15/173* (2006.01)
*H04L 12/24* (2006.01)

(52) U.S. Cl.
CPC ........ *H04L 41/0813* (2013.01); *H04L 41/0823* (2013.01)

(58) Field of Classification Search
CPC .................. H04L 41/0813; H04L 41/0823
USPC ................................. 709/223, 224
See application file for complete search history.

(56) References Cited

U.S. PATENT DOCUMENTS

| 6,212,386 | B1 * | 4/2001 | Briere et al. ............. 455/447 |
| 6,970,696 | B1 * | 11/2005 | Fuoss et al. ............. 455/417 |
| 7,533,170 | B2 | 5/2009 | Fellenstein et al. |
| 8,554,883 | B2 | 10/2013 | Sankaran |
| 2004/0098411 | A1 | 5/2004 | Highleyman et al. |
| 2004/0098421 | A1 | 5/2004 | Peng |
| 2005/0120106 | A1 | 6/2005 | Albertao |
| 2005/0267916 | A1 | 12/2005 | Tone et al. |
| 2006/0233182 | A1 | 10/2006 | Appanna et al. |
| 2009/0198802 | A1 | 8/2009 | Tanner et al. |
| 2009/0299884 | A1 | 12/2009 | Chandra |
| 2010/0082841 | A1 | 4/2010 | Dubal et al. |
| 2010/0095291 | A1 * | 4/2010 | Kota et al. ............. 717/173 |
| 2012/0295609 | A1 * | 11/2012 | Li et al. ............. 455/423 |
| 2013/0007258 | A1 | 1/2013 | Stern et al. |
| 2014/0033188 | A1 | 1/2014 | Beavers et al. |

* cited by examiner

*Primary Examiner* — Hieu Hoang
(74) *Attorney, Agent, or Firm* — Sutherland Asbill & Brennan LLP

(57) ABSTRACT

Systems and methods for implementing network changes are described herein. In one aspect, a network change procedure may be comprised of a plurality of scripts that may implement a change in the network. In one embodiment, the deployment may be paused after the script has been executed. During the pause, a change management server may determine the impact of the change on the network. If the change had a positive effect, the change management server may execute another script to make another network change. However, if the change had a negative effect, the change management server may initiate one or more remedial actions.

19 Claims, 7 Drawing Sheets

NETWORK CHANGE MANAGEMENT

CROSS-REFERENCE TO RELATED APPLICATION(S)

This application is a continuation of U.S. Nonprovisional application Ser. No. 13/586,819 filed Aug. 15, 2012, the entire disclosure of which is hereby incorporated by reference.

BACKGROUND

Computer networks have expanded in size and complexity as networking technology is improved or developed to provide increased capability and performance. In the past, computer networks implemented network updates using a group deployment strategy that made changes on the network as a whole. Under this approach, changes involved cutting and pasting configuration information directly onto network devices and manually evaluating the results and the updates either worked or failed as a whole. Accordingly, to recover from failure, the updates would have to be rolled back. In less complex networks, this approach was ideal in view of the sophistication of the network and the demands placed on the network. However, new approaches that account for making changes within a network in view of network technology, network complexity, and network demand may be desirable.

Figure 1:
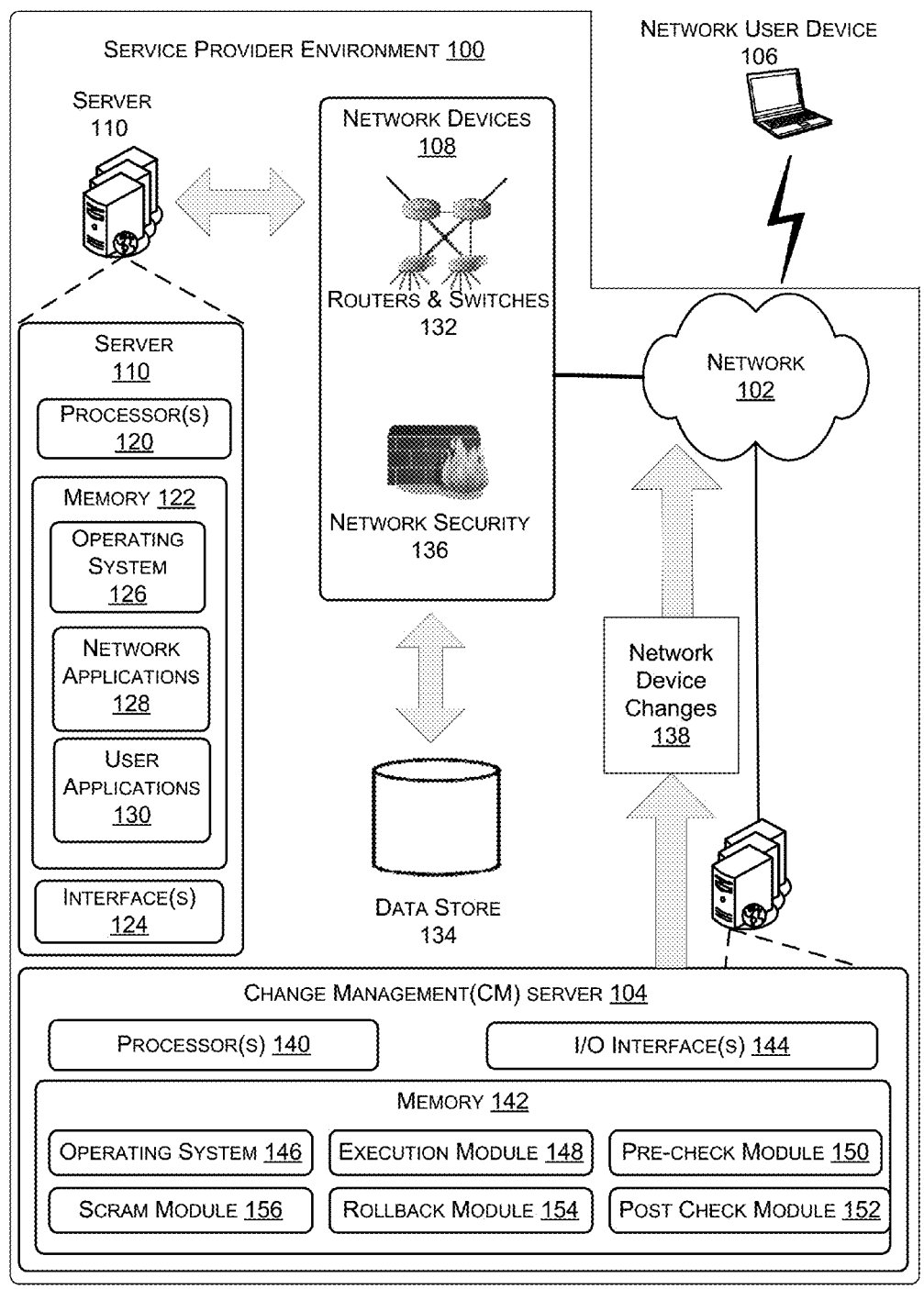
FIG. 1 illustrates a system for implementing changes on a service provider environment in accordance with an embodiment of the disclosure.

Certain implementations will now be described more fully below with reference to the accompanying drawings in which various implementations and/or aspects are shown. However, various aspects may be implemented in many different forms and should not be construed as limited to the implementations set forth herein; rather, these implementations are provided so that this disclosure will be thorough and complete and will fully convey the scope of the disclosure to those skilled in the art. Like numbers refer to like elements throughout; hence, if a feature is used across several drawings, the number used to identify the feature in the drawing where the feature first appeared will be used in later drawings.

DETAILED DESCRIPTION

Networks have evolved into increasingly complex systems that continue grow in size and capability to meet increased user demand for online services and products. Over time, the networks may need to be changed or updated to maintain performance. For example, network administrators may strive to maintain performance as part of a service level agreement (SLA) to clients. In some cases, the network may not be able to be taken offline to make changes or updates. Accordingly, the network changes may be implemented in a way to maintain the SLA terms.

Described herein are: systems and methods for systematically generating network changes, validating the network changes and the network prior to change implementation, and making changes to the network in a systematic way by using a operation-by-operation approach that incorporates feedback from the network to guide network change implementation.

The system may implement a network change using predetermined commands or code to implement a network change. Networks may include vast numbers of similar hardware and software that may need to be maintained or changed in the same or similar manner. Accordingly, a common script associated with a network may be generated to implement the same type of change in several instances. In some instances, a network change may incorporate several common elements that may be shared amongst different network changes. The system may apply a common script or a series of common scripts to make changes to the network. The common scripts may force the network changes to be made in the same manner time and time again. In this way, the network changes may become more consistent despite the fact that the changes may be implemented by different network administrators.

The system may also implement network changes in an operation-by-operation manner. For example, a network change (or network changes) may be deconstructed into one or more operations. In this manner, a change to a network may be done in increments so that the all of the changes needed to implement an update are not required to be done all at once. In this way, a single update may be deconstructed or a group of related or unrelated updates may be deconstructed into incremental operations.

Prior to implementing the operations of a network change procedure, the system may validate or check each operation prior to implementation. The pre-check may include verifying that the appropriate scripts are being used and that they may be used in the proper order or sequence. Further, the pre-check may also include verifying that the network is in a state in which the change may be implemented without negatively impacting the network. The network pre-check may also include verifying that the network is expected to remain in the appropriate state until the change is completed in its entirety or that an incremental operation within the network change procedure may be completed within an allotted time window. The pre-check may also include verifying the hardware and software configurations are consistent with the network change procedure 138. In that, the changes being implemented by the network change procedure are proper based, at least in part, on the hardware and software configuration of the network interconnect devices 108. For example, the network change procedure 138 may be based on certain hardware versions or software versions already implemented on the network interconnect devices 108 or the network 102. The pre-check may include verifying the hardware, software, or both before implementing the network change procedure 138.

Further, the system can implement a network change procedure that may include a pre-check prior to implementation. Similarly, the network may be subjected to a pre-check to determine if the network is available and/or in a state that may facilitate at least one of the changes specified in the network change procedure. Following the pre-check, the system may implement the network change in an operation-by-operation manner.

The system may incorporate pauses between each operation to determine if the incremental change may have negatively impacted the network. These pauses enable the network to operate as intended and then provide performance information to the system to analyze the impact of the change. When the performance information indicates that the network is performing as intended, the system may implement the next portion of the network change procedure. However, when the performance information indicates that the network is not performing as intended, the system may attempt to remedy the non-performing behavior.

Illustrative System

FIG. 1 illustrates a representative service provider environment 100 that includes a network 102, change management (CM) server 104, and a user device 106 that may interface with the network 102 via a web server (not illustrated). Further, the network 102 may include network devices 108 which may be devices or components that transfer or processes information between the network user device 106 and the network server 110. At a high level, the CM server 104 may develop and generate a network change procedure that makes changes to the network 102 or direct components of the network 102 to implement specified changes. These changes may impact any hardware, software, or combination thereof that may be used by the network 102 to process, route, and store information or to provide any service that may be offered over the network 102 to user devices.

The network 102 may include, but is not limited to: one or more servers 110, routers and switches 112, data stores 114, network translators 116, or network security elements 136.

The network 102 may include several network devices 108 and a server 110 that are in electrical communication with each other via the network devices 108. Only a single server is shown in FIG. 1 for the purposes of illustration and ease of explanation. The network server 110 may include: one or more processors 120, memory 122, and Input/Output interfaces 124. The processors 120 may comprise one or more cores and are configured to access and execute (at least in part) instructions stored in the one or more memories 122. The processor 120 may include (without limitation): a central processing unit (CPU), a digital signal processor (DSP), a reduced instruction set computer (RISC), a complex instruction set computer (CISC), a microprocessor, a microcontroller, a field programmable gate array (FPGA), or any combination thereof. The network server 110 may also include a chipset (not shown) for controlling communications between the one or more host processors 120 and one or more of the other components of the network server 110. In certain embodiments, the network server 110 may be based on an Intel® Architecture system and the processor(s) 120 and chipset may be from a family of Intel® processors and chipsets, such as the Intel® Atom® processor family. The one or more host processors 120 may also include one or more application-specific integrated circuits (ASICs) or application-specific standard products (ASSPs) for handling specific data processing functions or tasks.

The one or more memories 122 comprise one or more computer-readable storage media ("CRSM"). In some embodiments, the one or more memories 122 may include: non-transitory media such as random access memory ("RAM"), flash RAM, magnetic media, optical media, solid state media, and so forth. The one or more memories 122 may be volatile (in that information is retained while providing power) or non-volatile (in that information is retained without providing power.) Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 122 may store an operating system 126 that includes a plurality of computer-executable instructions that may be implemented by the processor 120 to perform a variety of tasks to operate the interface(s) 124 and any other hardware installed on the network server 110. Generally, the operating system operates as an interface between the hardware and the applications being processed by the network server 110. These may include, but are not limited to: memory management, file system management, device drivers, security, and networking.

The memory 122 may also include, but is not limited to, server applications 128 that may be used to perform operations or services on the network 102. For example, this may include interfacing with other network servers or other components on the network 102. The server applications 128 may perform functions to sustain network server 110 operations by sending or receiving network traffic to maintain proper communication protocols to ensure a smooth exchange of information between network participants.

The memory may also include, but is not limited to, user applications 130 that may be used to perform operations or services for network users (e.g., network user device 106). This may include sending and receiving instructions or content between the network server 110 and the network user device 106. For example, the network 102 may support online merchant operations in which users query the network 102 looking to purchase goods and/or services from an online merchant. In another embodiment, the network 102 may operate as a remote processing and storage center that a user may use to store data or applications that are processed by the network server 110 and streamed or provided to the network user device 106. For example, the network user device 106 may shift the application processing workload or storage to the network server 110 to minimize the amount of processing and storage workload on the network user device 106.

The Input/Output (I/O) interfaces 124 may also comprise one or more communication interfaces (or network interface devices) to provide for the transfer of data between: the other network devices, the CM server 104, network user devices 106 and another device directly (such as in a peer-to-peer fashion) via a network 116, or both. The communication interfaces may include, but are not limited to: personal area networks ("PANs"), wired local area networks ("LANs"), wireless local area networks ("WLANs"), wireless wide area networks ("WWANs"), and so forth. The communication interfaces may utilize acoustic, radio frequency, optical, or other signals to exchange data between the user device 104 and another device such as an access point, a host computer, a server, a router, a reader device, another user device 104, and the like. The network 102 may include, but is not limited to: the Internet, a private network, a virtual private network, a wireless wide area network, a local area network, a metropolitan area network, a telephone network, and so forth.

The network devices 108 may include many different types of hardware, software, and a combination thereof to provide and support various operations, applications, and services. Network devices 108 may include any device or application that facilities communications between the CM server 104, the network user device 106, and the network server 110. The network devices 108 may be considered communication interconnect components that may route, store, or process information between the CM server 104, the network server 110, and the datastore 134. By way of example, the network devices 108 may include, but are not limited to, routers and switches 132 network security 136, and infrastructure devices and services that support operation of the network.

The routers and switches 132 are the building blocks of networking. Switches may couple the components of the network 102 together and facilitate communication between those components. This may include information being sent between the server 110 and data stores 134. The switches may include, but are not limited to, unmanaged switches and managed switches. The managed switches may be configurable either locally or remotely to adapt to network changes as needed. For example, the managed switches may need to be changed to reflect changes in the network to accommodate increased network traffic or network expansion. Routers may connect one or more networks together and route information received by the network 102. For example, a router may route or dispatch information that is received by the network 102 over the switches to the network server 110. The routers and switches may be programmed to route information in a certain way or they may reference a data store to determine where to send the information. Accordingly, the routers and switches may need to be updated to reflect changes or updates made to the network 102. The routers and switches 132 may also include an access point, a gateway device, a bridge, a hub, and/or a repeater. The access point may be a wired or wireless device that receives information from remote users and transfer the information to the network 102. The gateway device may be used to interface with another network that uses different protocols than the network 102 in FIG. 1. The bridge may be a device that connects several network segments along the data link layer (e.g., Open System Interconnection model layer 2). The hub may multiple segments of the network 102 together to make them act as a single segment. The repeater may be a communications device that may amplify or regenerate communications signals over the network 102.

The network devices 108 may also include one or more network applications and data stores 134 that store information processed by the network server 110. The network applications may include any program or firmware that facilitates the routing, transferring, processing, and/or monitoring of information over the network 102 between the network user device 106 and the network server 110. The data store may include any type of computer-readable memory as described above. The data store may store network data or user data as needed to perform the operations, services, or functions as directed by the network administrator.

The network devices 108 may also include network security 136 that protects the network 102 from unauthorized access or monitors network activity to detect malicious behavior on the network 102. The network security 136 may include, but is not limited to, the hardware, software, or combination thereof to implement authentication protocols, firewalls, virus detection, and network monitoring.

The network devices 108 described above provide a brief example of the hardware and/or software that may need to be configured, managed, and updated. The CM server 104 can play a role in making updates, changes, or upgrades to the network devices 108. In one embodiment, the CM server 104 may determine a network device change process for the network devices 108. As shown by block 138, the network change process may be used by the CM server 104 to provide changes to devices in the network, e.g., change instructions that are implemented by the network; and/or changes to the network devices 108 directly as needed. In other embodiments, the CM server 104 may also be a component or element of the network 102.

The CM server 104 may include: a one or more processors 140, memory 142, and I/O interfaces 144 to implement the generation, distribution, and monitoring of network changes (e.g., network device changes 138) for the network devices 108.

The one or more processors 140 may individually comprise one or more cores (as described above) and are configured to access and execute (at least in part) instructions stored in the one or more memories 142. The one or more memories 142 may comprise one or more CRSMs as described above.

The one or more memories 142 may store instructions for execution by the one or more processors 140 which perform certain actions or functions. These instructions may include an operating system 146 configured to manage hardware resources (such as the interfaces 144) and provide various services to applications executing on the one or more processors 140. The one or more memories 142 may also store lists, arrays, databases, flat files, and so forth. In some implementations, the memories 142 may be stored in memory external to the CM server 104 but accessible via the network 102, such as with a cloud storage service.

The memory 142 may also include one or more modules to generate and implement the network device changes and to monitor network 102 performance and take corrective action if the network changes are determined to negatively impact network performance. The modules may include: an execution module 148 to generate scripts and/or determine commands used to roll changes out to devices, a pre-check module 150 that may validate the network device changes 138 and the network 102, a post-check module 152 that may monitor the network 102 during change implementation, a rollback module 154 that may take corrective action during change implementation, and a scram module 156 that aborts change implementation.

The execution module 148 may determine commands to apply or generate the network change scripts that direct or make changes to the network devices 108. The network device changes may comprise a plurality of scripts that include instructions to make discrete changes to the network devices 108 and scripts may be appended or combined together. The execution module 148 may also include or have access to a library of change scripts that may be pre-approved by the network administrator to make certain types of changes to the network 102. The pre-approved scripts may also be arranged into pre-approved sequences, such that the network change procedure 138 may implement changes in a certain order. For example, the scripts may include specific instructions on how to reconfigure or add switches to account for changes or additions to the network devices 108. Another script may specify how to update or change certain types of databases stored in the data store 134. A script may include, but is not limited to: instructions for naming convention protocols, file transfer protocols, software patch protocols, software upgrade protocols, security upgrade protocols, and/or any other change that may be implemented on the network devices 108. The execution module 148, in conjunction with the pre-check module 150, may enforce the use of certain scripts that may be used to generate the network change device procedure 138.

The network administrator may also approve sequences and/or orders of scripts to ensure or regulate network change implementation. The consistency between scripts or sequences of scripts enforces consistent changes and increases conformity between different users that are making changes to the network devices 108. For example, a network change to one component may also require additional changes to other components or databases to properly implement the change. A network application 134 change may also require the network server 110 to upgrade or modify its operating system 126. For example, the network application may include firewall or network security applications. Accordingly, the network change process may include a script to upgrade the network application 134 and the operating system 126. Further, the execution module 148 may dictate that the operating system 126 should be upgraded before the making any changes to network application 134. In another embodiment, the network application 128 change may not require an operating system 126 upgrade. In this instance, the execution module 148 may not generate the network device changes 138. However, the network application 134 change may require a new database to store new information or update to an existing database to accommodate format or structural changes to the data being stored in the database. In this case, the execution module 148 may require that a database script be implemented prior to making the network application change.

The execution module 148 may generate a network change procedure in a granular fashion. As noted above, scripts may be distilled down to making very small changes on the network. As such, these scripts may be appended together to form a portion of the network device changes 138 that makes a small change to the network devices 108. However, the scripts may be appended or combined to make or implement network changes in their entirety.

The execution module 148 may also generate a tracking ticket that is associated with the network change procedure 138. The tracking ticket may record which commands or scripts are being implemented by the network change procedure 138. The tracking ticket may also receive performance information from the network interconnect devices impacted by the network change procedure 138. Also, the performance information from the network 102 may also be stored with the tracking ticket. In one embodiment, the network change procedure 138 may also include commands to collect performance information from the network interconnect devices 108 or any other portion of the network 102.

The pre-check module 150 may implement an automatic or manual check of the network change procedure and/or the network 102 before the network device changes 138 is provided to the network 102. The pre-check module 150 may validate the types and/or sequencing of the scripts that comprise the network device changes. For example, the pre-check module 150 may enforce the use of scripts and/or may confirm that a script designated to make a certain change is consistent with an authorized script that is designated to make that type of change. In this way, the pre-check module 148 enforces a consistency to the changes made on the network by different users. The pre-check module 150 may also enforce the sequence or order of changes being made on the network devices 108. For example, if a change to a switch requires updates to other switches, network components, or databases, the pre-check module 150 may confirm that the network device changes include those changes. Additionally, those changes may be done in a certain sequence or order. Once the network device changes 138 have been validated, the pre-check module 150 may turn its attention to the status of the network 102 to determine if one or more components of the network device changes 138 may be implemented in view of the current network state.

The pre-check module 150 may query the network 102 for status information on any or all aspects of the network 102. The pre-check module 150 may determine whether the network 102 is in a state that will enable the implementation of one or more changes of the network change procedure. In one embodiment, the pre-check module 150 may determine that the network 102 is in a state that will enable all of the network changes in the network device changes 138 and that the network 102 is likely to remain in that state until the network change procedure has been implemented in its entirety. In another embodiment, the pre-check module 150 may determine that the network 102 is in a state that will enable at least a portion of the network changes specified in the network change procedure. In this instance, the implementation of the network device changes 138 may be staggered, so that certain changes may be made as the network 102 becomes available to make the change. Further, the scripts may include instructions for a delay between the scripts. The delay allows the network performance to be monitored after the change to verify that the change was not detrimental to the network 102. In one embodiment, the pre-check module 150 may also verify that the hardware and software configurations of network interconnect devices 108 or the network 102 are consistent with the changes being implemented by the network change procedure 138. This may include determining that underlying configuration assumptions for the network are proper. For example, the pre-check module 150 may not initiate the network change procedure if the changes being implemented are not capable of being implemented. For instance, upgrading the software of a device to perform a hardware function that the device, as configured, is not capable of performing due to a lack of hardware. In this case, the device hardware may also have to be upgraded.

The post-check module 152 may monitor the network 102 after one or more changes have been made as part of the network device changes 138. The post-check module 152 may query network devices 108 in the network 102 for performance information; or, it may monitor the output, error, or event log files of the network 102 to determine the impact of network changes. In another embodiment, the network 102 may be configured to provide performance information to the pre-check module 152. This performance information may be provided continuously or intermittently as desired by the network administrator. The performance criteria may set by the network administrator or by service level agreements that dictate network performance goals. The performance information may be related to performance characteristics associated with the network 102, the network interconnect devices 108, or the server 110. The performance characteristics may include latency, throughput, response times, utilization, bandwidth, and/or packet loss. Performance information may also include error logs or readings that indicate that some portion of the network 102 is not performing as intended.

In one embodiment, the network device changes 138 may include commands that direct the network 102 to provide specific performance information to the post-check module 152. In another embodiment, the network device changes 138 may direct the post-check module 152 to query the network 102 for specific performance information. In this way, the network device changes 138 may include post-check instructions (in addition to the delay instructions) to assist in monitoring network performance during changes. In some cases, network performance may degrade or operate incorrectly as a result of the change. The CM server 104 may be given a role to alleviate or correct the poor performance. The rollback module 154 may assist in the corrective process.

The rollback module 154 may implement corrective actions on the network 102 when a change to the network devices 108 is determined to be the cause of degraded or incorrect network performance. As noted above, the network device changes 138 may comprise a plurality of discrete scripts that implement network changes in an operation-by-operation process. When the post-check module 152 detects network problems, the rollback module 154 may determine which scripts or changes may have caused the problem. Accordingly, the rollback module 154 may undo those changes to the network devices 108 and direct the post-check module 154 to assess network performance without those changes. In one embodiment, the discrete scripts of the network change procedure may be undone one at a time and in the order in which they were implemented. This provides the network 102 with the opportunity to undo the changes in a deliberate manner and may be used to troubleshoot the network performance issue.

If the network performance reaches a predetermined threshold, the rollback module 154 may alert a network administrator to investigate the issue or try to re-implement the undone changes and monitor network performance. In one embodiment, the network performance may improve beyond a predetermined threshold and the rollback module 154 may attempt to re-implement the changes that were undone. In some instances, the network changes may not be directly tied to the degraded network performance. For example, one of the network devices 108 may lose power. In this embodiment, the rollback module 154 may notify the network administrator to intervene and decide to go off script from the network device changes 138. The decision to go off script may be done when network 102 operates in way that causes unexpected user impact or violates one or more terms of a service level agreement associated with the network 102. It may also go off script when the network change procedure includes an incorrect script (or sequence of scripts) and/or a script that can not be executed. However, prior to going off script, additional corrective actions may be taken by the scram module 156 to minimize user interruptions.

The scram module 156 may determine a safe state for the network 102 when network performance exceeds or falls below a predetermined threshold. The safe state may include a network configuration that does not include the last five changes that were made to the network devices 108. Therefore, instead of undoing each change one at a time and determining the impact of each undone change, the scram module 156 may undo all five changes without assessing the impact of each undone change. In some instances, the undone changes may be done in reverse sequence of their implementation. In other instances, the changes may be done out of order, one at a time, or concurrently.

In another embodiment, the scram module 156 may determine that the poor network performance is related to changes made to specific network devices 108. The scram module 156 may determine that a safe state may be achieved by isolating the network device 108 instead of undoing changes on to network device. For example, the scram module 156 may direct the network device 108 to shut down all ports on the component. In this way, the network device 108 may be isolated from the network 102 and the functions or operations of this network device 108 may be routed to other network devices 108 in the network 102.

Similar to those described above, the one or more I/O interfaces 144 allow for the coupling of devices such as displays, keyboards, storage devices, and so forth to the one or more processors 140 of the CM server 104. Likewise, the one or more I/O interfaces 144 may be configured to couple the CM server 104 to one or more networks 102.

The service provider environment 100 may also include a network user device 106 that interfaces or communicates with the network 102. Although not shown in FIG. 1, the user device may include a processor, memory, and I/O interfaces to view and/or exchange information with the network 102. As noted above, the processor, memory, and I/O interfaces are similar to those discussed above for the network server 110 and the CM server 104. The network user device 106 may include any computing device that interfaces with the network 102. These may include, but are not limited to: a desktop personal computer, a lap top computer, a tablet computer, or a hand-held computer.

Illustrative Methods

Figure 2:
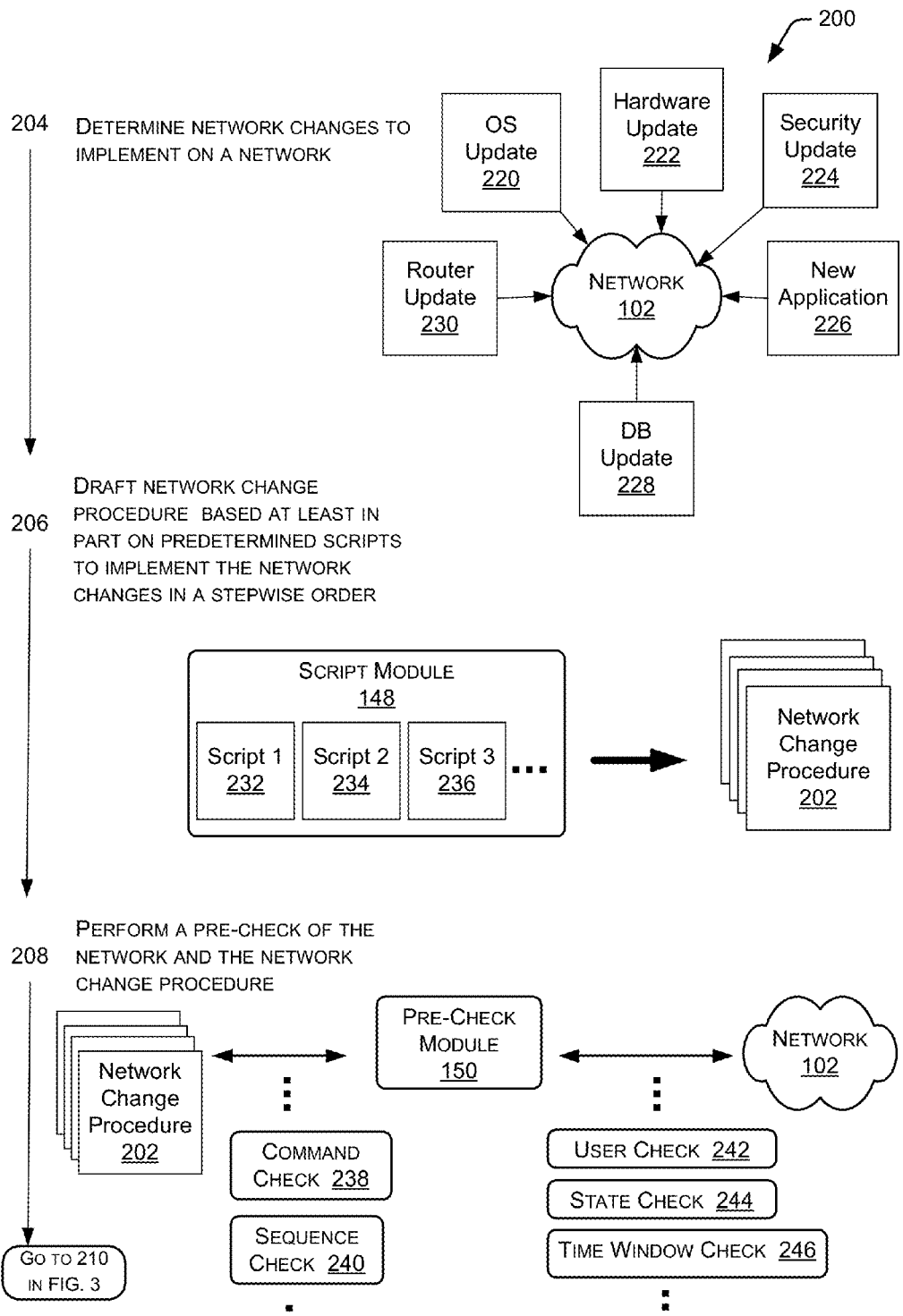
FIGS. 2 and 3 illustrate a flow diagram with corresponding illustrations for implementing changes on a network in accordance with an embodiment of the disclosure.
Figure 3:
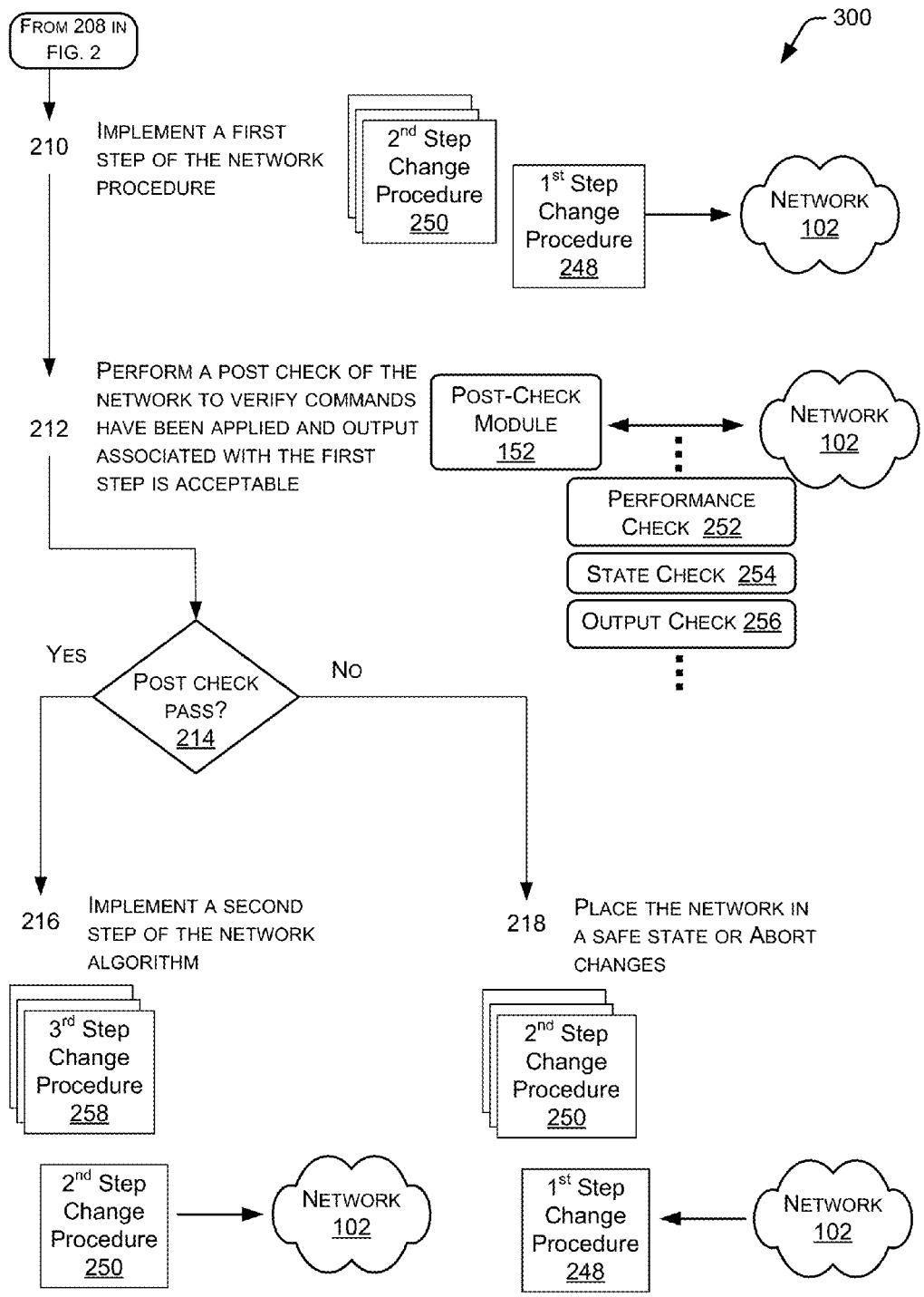

FIGS. 2 and 3 illustrate a flow diagram 200 with corresponding illustrations for implementing changes on a network device 108 using a network change procedure 202 generated by the CM server 104. FIGS. 2 and 3 are a representation of one embodiment for implementing network changes on the network 102. Additional embodiments can include acts performed in a different order, additional acts, or even omitting a portion of the acts illustrated in FIGS. 2 and 3.

At block 204, the CM server 104 may receive instructions from a network administrator to make one or more changes to the network device 108. The changes may include, but are not limited to: an operating system update 220, a hardware update 222, a security update 224, deployment of a new application 226, a network database update 228, and/or a router or switch update 230, such as an update to the configuration of a router or switch, an update to the firmware or software of a router or switch.

At block 206, the execution module 148 may be used to generate the network change procedure 202 based in part on the inputs received at block 204. Alternatively, the network administrator may select specific scripts to deploy using a graphical user interface that presents the available authorized scripts that may be used to implement the network device changes 138. For example, the router update 230 may be implemented using a sequence of scripts (e.g., script 1 232, script 2 234, script 3 236). The type and sequence of the scripts may be dictated by network design and this example is only intended for explanatory purposes. For example, script 1 232 may be instructions to the network devices 108 to route communications around a specific router for a period of time. Script 2 234 may implement a configuration change on the specific router, and script 3 236 may direct the network devices 108 to start using the specific router again. At the very least, the network change procedure 202 may include one or more operations that may be implemented in a sequence to make the router update. Each of the three scripts 232, 234, 236 may be selected by the network administrator using a user interface to the CM server 103, e.g., a web browser interface, a client program, etc. and the scripts 232, 234, 236 may be selected from a library of pre-approved scripts. The scripts may include pre-approved instructions that may complete a specific change or operation. In this way, changes to the network 102 may be standardized to follow specific protocols. This may prevent multiple users from using different instructions which may result in changes being performed in an inconsistent manner and may ensure that the user logging in to implement the changes is authorized those changes. The execution module 148 may enforce the use of specific scripts for certain tasks and may require that unapproved scripts provided by users to be submitted to an approval process before they are incorporated into the network change procedure 202. Although the scripts 232, 234, 236 may be updated by the user to accommodate change specific attributes, the execution module 148 may limit the amount or type of changes that may be made without being sent through the approval process. For example, the user may be able to update certain fields in the script, but would not be given access to change the more substantive features of the script. This execution module 148 enforcement feature may also apply to ordering or sequencing of the scripts 232, 234, 236 within the network change procedure 202.

At block 208, the pre-check module 150 may receive the network changes and implement a series of checks that may include, but are not limited to, a command check 238 and a sequencing check 240. The command check 238 may verify that the instructions with the selected scripts 232, 234, 236 are proper and that the instructions are executable on the network devices 108. The command check 238 may make sure that the instructions are operating on the appropriate components; such as, that the changes are being applied consistently across the components and that the changes are consistent with each other. For example, an error may occur when instructions are made to change the configuration of one component and then update a database in support of that change, but reference another component that was not changed. The command check 238 may also verify that the instructions within each script are executable by the network 102. The sequencing check 240 may verify the sequencing of the scripts 232, 234, 236 to ensure they are executable in the proposed sequence. The pre-check module 150 may also perform a user check 242 to verify that the user requesting the change on the network is authorized to make that change.

The pre-check module 150 may also do a state check 244 on the network 102. This may include verifying that the network 102 is in a state that would be appropriate to make a change. For example, if the network traffic was peaking and the network 102 did not have the capacity to route traffic through other routers, the network change procedure would attempt to make a router configuration change at that time. The pre-check module 150 may also do a time window check 246 to confirm that the network is likely to remain in a certain state for a certain period of time. In this way, the network 102 changes may be implemented without causing a disruption to the network users. In one embodiment, the time check 246 may determine if the time window is large enough to implement the entire network change procedure 202. In another embodiment, the time check 246 may determine if the time window is large enough to implement one or more portions of the network change procedure 202. For example, the network change procedure 202 may implement a portion of changes and then wait to implement the remaining portions of the changes at a later time.

At block 210, the CM server 104 may implement the first operation 248 of the network change procedure 202 on the network 102. For example, a router update may include a first operation 248 that may direct the network 102 to direct traffic around the targeted router. The second operation of the router update 250 may be waiting to be processed until the post-check module 152 has confirmed the impact of the first operation 248.

At block 212, the post-check module 152 may initiate a performance check 252, a state check 254, and an output check 256 on the network 102. The performance check 252 may verify that the network performance for the network server 110, the routers and switches 132, the data store 134, and the network security 136 components are operating as intended. The state check 254 may verify that the network 102 is in an appropriate state following the implementation of the first operation 248 of the network change procedure 202. The post-check module 152 may also implement an output check 256, to verify that the information being sent to the network user device 106 meets any service level agreement requirements or the or that the output from the network 102 is consistent with outputs prior to the change.

At block 214, the post-check module 152 may determine if the first operation 248 passes all the criteria described in the description of block 232. If the first operation 248 passes, the change implementation proceeds to block 216. If the first operation 248 fails, then the change implementation process proceeds to block 218.

At block 216, the CM server 104 may implement the second operation 250 of the network change procedure 202 when the first operation 248 passes the post-check described in the description of block 212. The CM server 104 may not implement the third operation 258 until the second operation has passed a post check similar to the one described in the description of block 212.

At block 218, CM server 104 may place the network in a safe state by rolling back one or more network changes. In this embodiment, the CM server 104 may roll back the first operation 248 and determines if the rollback had a positive impact. If the rollback was not effective, the CM server 104 may notify the network administrator to take additional off script actions to remedy the network problem.

Figure 4:
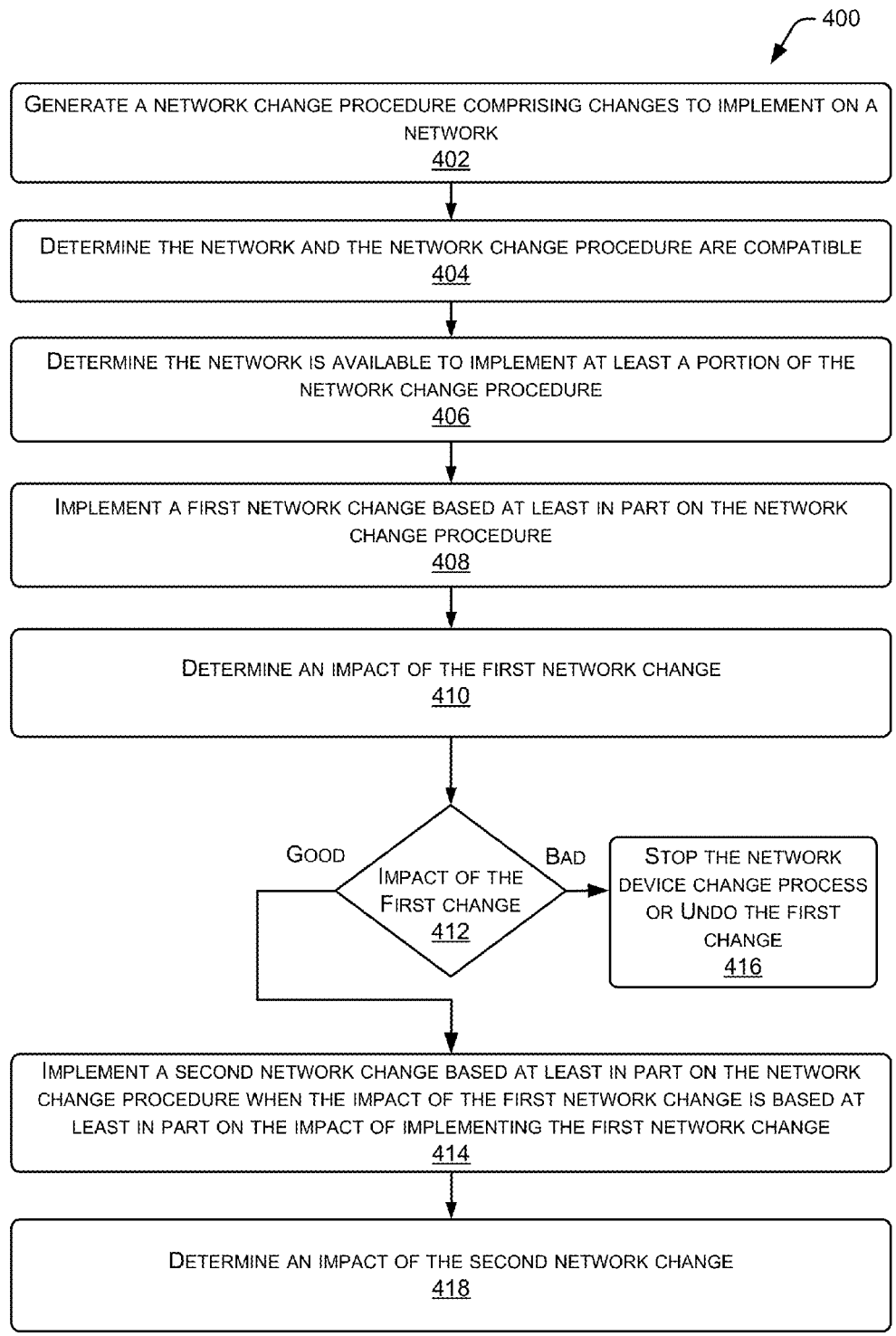
FIG. 4 illustrates a flow diagram of another exemplary method for implementing changes on a network via a change management server in accordance with an embodiment of the disclosure.

FIG. 4 illustrates a communication flow diagram for method 400 for implementing changes from the point of view of the CM server including several interactions between the CM server 104 and the network 102. FIG. 4 is a representation of one embodiment for implementing changes on the network 102. Additional embodiments can include acts performed in a different order, additional acts, or even omitting a portion of the acts illustrated in FIG. 4.

At block 402, the CM server 104 may generate a network change procedure 202. The network change procedure 202 may include a first operation 248, a second operation 250, and a third operation 258. For example, the network change procedure 202 may be intended to reconfigure a router in the network 102. The first operation 248 may configure the network 102 to route traffic around the router through other routers on the network 102. The second operation 250 may update or reconfigure the router to perform a different function or to operate in a slightly different manner. The third operation 258 may instruct the network 102 to begin routing information through the newly updated router.

At block 404, the CM server 104 may determine that the network change procedure 202 is compatible with the network 102. For example, the CM server 104 may confirm that the targeted router exists on the network 102 and that the router is in a state that is consistent with the change being made in the second operation 250. The CM server 104 may confirm that the router has not already been converted or upgraded. The CM server 104 may also confirm that the router is capable of being reconfigured or updated in view of the second operation 250. For instance, the CM server 104 may elect to not make the change if the router is not capable of being upgraded to the change in the second operation 250. The router may need another intermediate change before the second operation 250 change can be implemented. If the CM server 104 down checks the network change procedure for compatibility, the network administrator is notified to update the network change procedure 202 accordingly.

At block 406, the CM server 104 may also determine if the network 102 is in a state that may facilitate the implementation of the network change. In the router embodiment, this may include determining that other routers are available and have the capacity to manage network 102 traffic if the targeted router is pulled out of service.

At block 408, the CM server 104 may implement the first operation 248 of the network change procedure 202 if the pre-checks of the first operation 248 are passed. The pre-checks may include the pre-checks described in the discussion of the pre-check module 150 with regards to FIGS. 1 and 2.

At block 410, the CM server 104 may determine the impact of the first operation 248 change on the network 102. In the router embodiment, the CM server 104 may determine if the traffic has been rerouted around the targeted router. The CM server 104 may also verify that the other routers are handling the increased traffic. For example, the CM server 104 may verify that any SLA performance terms on providing information to and from the network 102 are in compliance. In this embodiment, the network 102 may be in compliance with the SLA performance terms.

At block 412, the CM server 104 may determine a course of action based, at least in part, on the impact of the first change. When the impact is expected or uneventful, the CM server may proceed to block 414 and when the impact is unexpected or bad, the CM server may proceed to block 416.

At block 414, the CM sever 104 may implement the second network change based, at least in part, on the impact of the first network change as described in the discussion of block 410. In this embodiment, the CM server 104 may implement the second operation 250 of the network change procedure 202.

At block 416, the CM server 104 may undo the first network change or may stop any further changes to the network 102.

At block 418, the CM server 104 may determine the impact of the second operation 250 change on the network. The CM server may initiate a performance check 252, a state check 254, and/or an output check 256. In the router embodiment, the CM server 104 may run a diagnostic check on the router and may even test the router with test traffic. When the impact is expected or uneventful the CM server may proceed to implement a third network change (not shown). The CM server 104 may also undo the second network change 250 when the impact is unexpected or bad (not shown).

Figure 5:
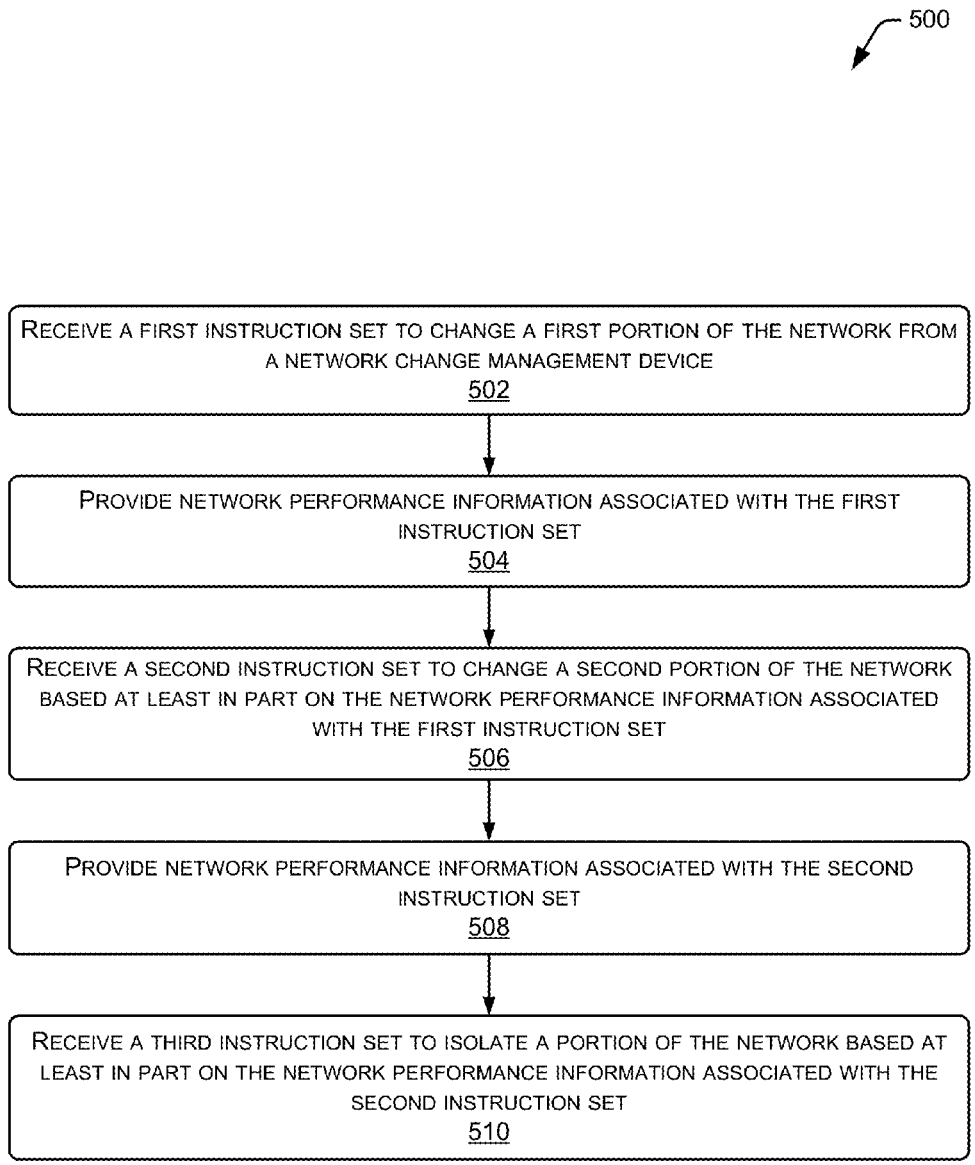
FIG. 5 illustrates a flow diagram of an exemplary method for implementing changes on a network in accordance with an embodiment of the disclosure.

FIG. 5 illustrates a communication flow diagram for method 500 for implementing changes from the point of view of the network devices 108 including several interactions between the CM server 104 and the network devices 108. FIG. 5 is a representation of one embodiment for implementing changes on the network devices 108. Additional embodiments can include acts performed in a different order, additional acts, or even omitting a portion of the acts illustrated in FIG. 5.

At block 502, the network devices 108 may receive a first instruction set to change a first portion of the network devices 108 from the CM server 104. In one embodiment, the first instruction set may include the first operation 248 of the network change procedure 202. As noted above in FIG. 4, the first operation 248 may include instructions directing the network devices 108 to direct traffic away from a targeted router.

At block 504, the network devices 108 may provide performance information associated with implementing the first instruction set. In the router embodiment, the network devices 108 may send traffic performance information related to one or more routers that were impacted by the first operation 248 change. The network devices 108 may also send any other traffic information that may indicate an issue with pulling the router from service. Particularly, any information that may be associated with SLA terms for the network. The rollback module 154 may monitor the performance information and determine to take corrective action when the performance data indicates changes to the network devices 108 may be the cause of or merely related to the problem. The performance information may also be saved to a tracking ticket associated with network change procedure 138. The tracking ticket may include the operations of the network change procedure 138 and the network performance information generated after each operation is implemented. The tracking tickets may be stored in the datastore 134 or in the CM server's memory 142.

At block 506, the network may receive a second instruction set to change a second portion of the network devices 108 based, at least in part, on the impact of the first instruction set on the network devices 108.

At block 508, the network devices 108 may provide network performance information associated with the second instruction set. In the router embodiment, the second instruction set may be the second operation 250 of the network change procedure 202. The second operation 250 may be related to reconfiguring the router to a different state or a different configuration. In an alternative embodiment, the CM server 104 may query the network for specific information that the network devices 108 may provide go the CM server 104.

At block 510, the network may receive a third instruction set to isolate a portion of the network based, at least in part, on the network performance information associated with the second instruction set. In one embodiment, the isolation may include directing a component to stop accepting inputs and/or stop providing outputs. In another embodiment, the isolation may include the CM server 104 directing the network devices 108 to ignore information from the isolated component and to not direct information to the isolated component.

Figure 6:
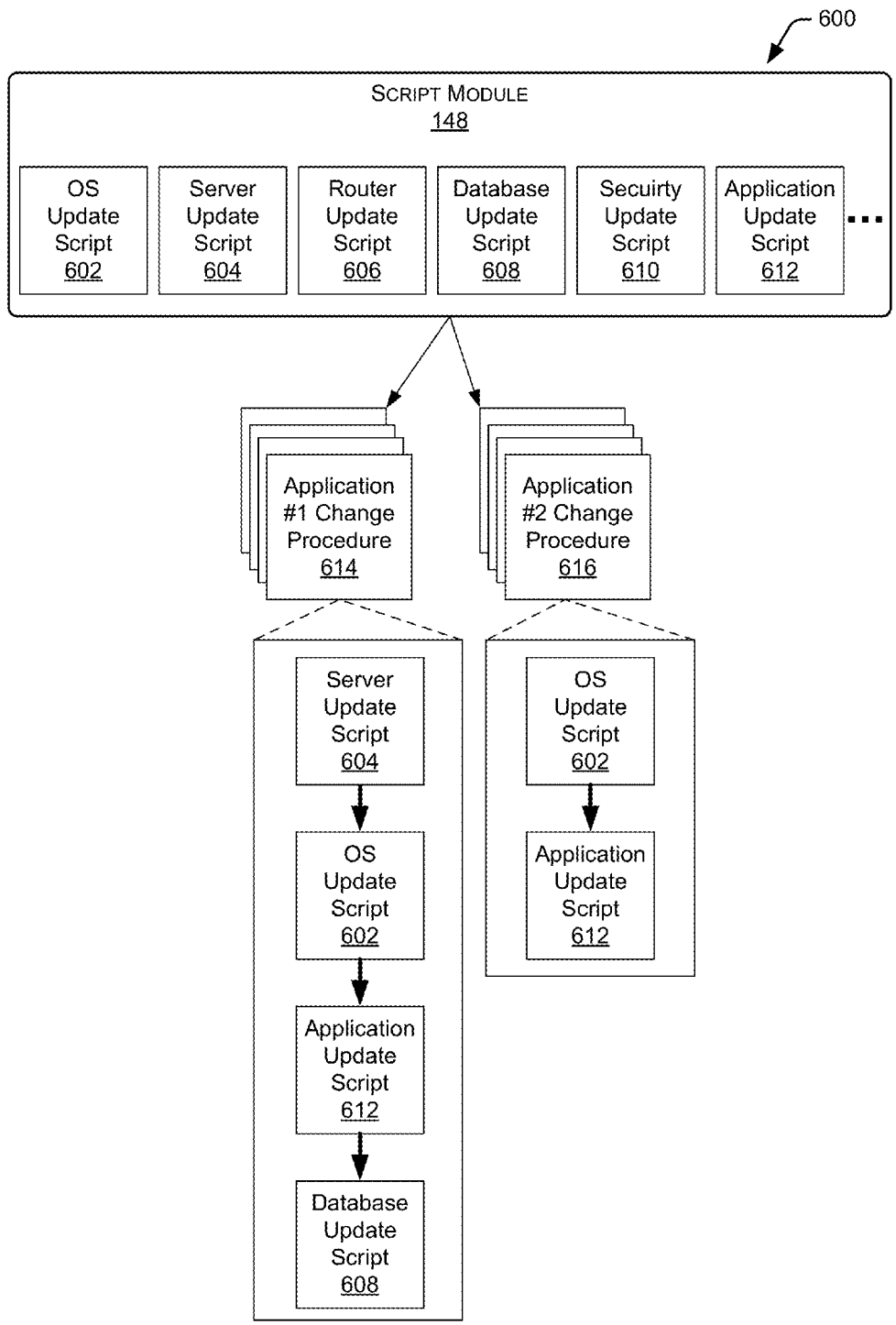
FIG. 6 includes an illustration describing the structure of one or more network changes that may be used to implement changes on the network in accordance with an embodiment of the disclosure.

FIG. 6 illustrates a block diagram 600 representation of the execution module 148 including one or more scripts that are available to create one or more network change procedures. In this example, the scripts are representative of pre-approved instructions to perform certain tasks in a network change procedure. A network administrator may choose from these tasks to generate a network change procedure or the CM server 104 may select and arrange the scripts to generate a network change procedure.

In this example, the scripts may include an operating system update 602, a server update 604, a router update 606, a database update 608, a security update 610, and an application update 612. At high level, the aforementioned scripts may be integrated together to implement a specific network change. Their arrangement may be dependent upon the type of change being made and the design or current state of the components of the network. By way of example, the network application #1 change procedure 614 and network application #2 change procedure 616 may be intended to make an update two different applications on the network 102. However, the updates to the first application may require several changes to several other components of the network 102 to be implemented properly. In contrast, the updates to the second application may need a fewer amount of to be properly implemented. For example, the first application may require a server update to include new capabilities to include more memory and a corresponding operating system update to be completed before the application update could be effective. Additionally, the new data generated by the application update may need a new entry in a database to store that data. Accordingly, the CM server 104 may select scripts from a library that includes pre-approved instructions to perform a variety of changes to the network devices 108. In the first application embodiment, the execution module 148 may use a server update script 604, an operating system update script 602, a network application update script 612, and a database update script 608 to generate the application #1 change procedure 614. The procedure 614 may provide a template for the network administrator to approve and edit to comply with their specific needs. For example, the scripts may include certain fields that may be edited to address the details of the change. These details may include the network application name, location, or any other applicable item that may address a network application specific detail. However, in one embodiment, the substantive portion of the change procedure or script may not editable so that the way in which applications changes are implemented is consistent from one network administrator to the next. If changes are needed beyond the editable portions of the script, the new script may need pre-approval or review before the script may be used to make network device 108 changes.

In contrast to first application change, the second application change may be done on a portion of the network 102 that is configured differently than the portion of the network 102 that uses the first application. Due to the configuration difference, the second application may be implemented using a different set of scripts. For example, the second portion of the network 102 already includes the updates to the server and database. Accordingly, the network application #2 change procedure 616 may only need an operating system update and the network application update to complete the application update on the network 102. In this way, the operating system update script 602 and the network application update script 612 may be incorporated into the network application #2 change procedure 616.

Figure 7:
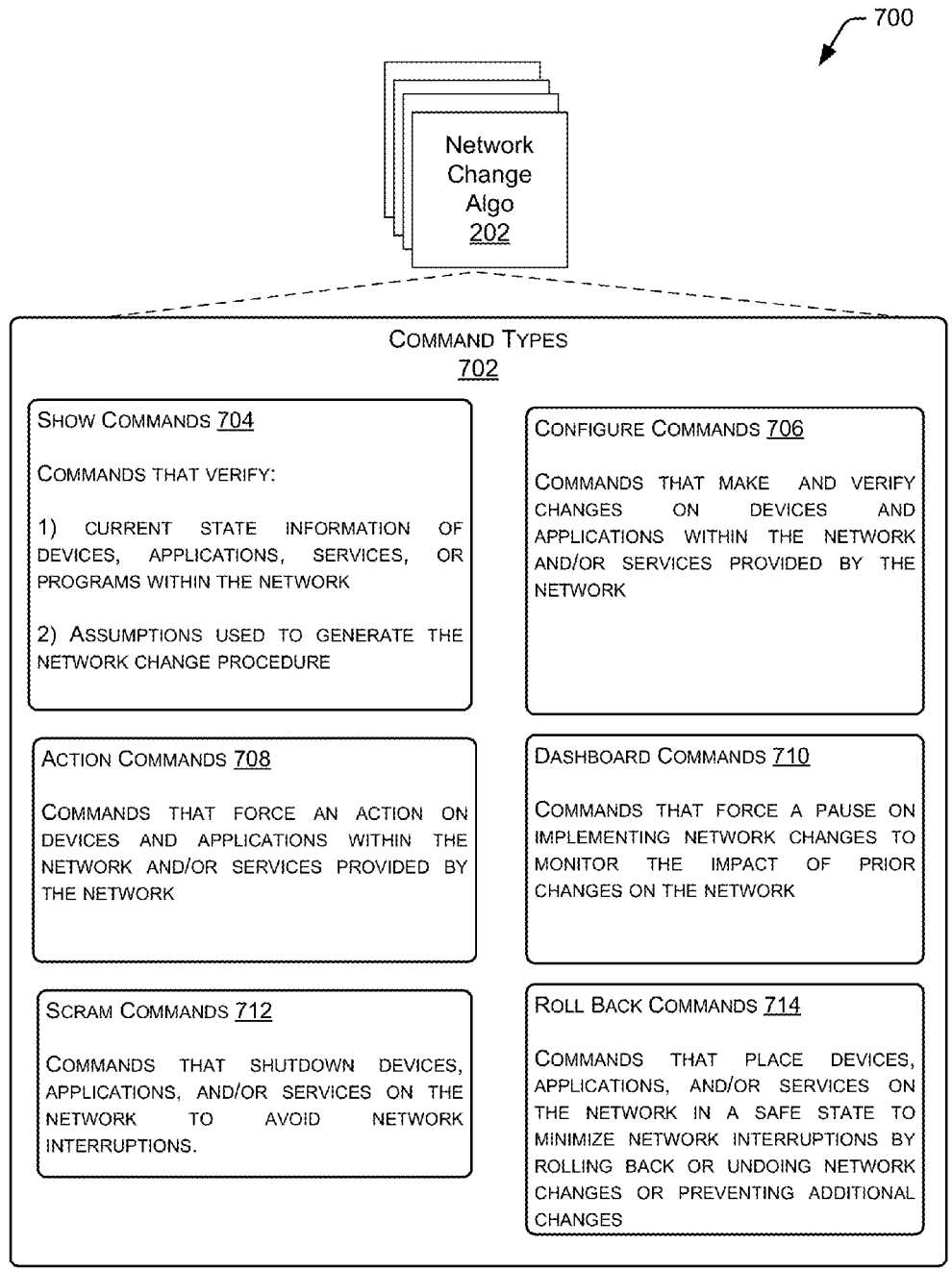
FIG. 7 includes an illustration describing the structure of the one or more commands that may be included in the network changes in accordance with an embodiment of the disclosure.

FIG. 7 is a block diagram 700 illustration of the commands that may be used within the scripts described above in the discussion of FIG. 6. The list of command types 702 is not an exhaustive list and may include all the commands that may be included within a script. The illustrated commands provide some insight in to how the scripts may operate to make changes to network devices 108.

The show commands 704 may verify the current state information of devices, applications, services, or programs within the network 102 and/or verify the assumptions used to generate a network change procedure 202. For example, the show command may be used to determine the state of the network prior to implementing the network change procedure 202. The responses to this command may include, but are not limited to, device configurations, network settings, application configurations, program configurations, device activity, network activity, application activity, and/or any other parameter, setting, configuration associated with network or its components.

The configure commands 706 may make and verify changes on the devices and applications associated with the network devices 108. These commands may be used to change settings or configurations of any network device 108 and then verify that the changes made were proper and/or the network device 108 may operate as intended after the change had been made.

The action commands 708 may force an action on the network devices. These commands may include, but are not limited to, save, config, reboot, and clear. The action commands may force non-reversible state change on a network device 108.

The dashboard commands 710 may enforce a pause in the implementation of the network change procedure 202. The pause may be for any predetermined amount of time that may be need to evaluate the change to determine whether the change had a negative, positive, or no effect on the network 102.

The scram commands 712 are commands that may shutdown network devices 108 on the network 102. These commands may also isolate one or more network devices 108 from the rest of the network 102. For example, a scram command 712 may shutdown the outputs of the network component or may tell the other network components to ignore the problematic network device 108.

The rollback commands 714 may place network devices 108 in a safe state by rolling back or undoing network device changes that may have been implemented at an earlier time by the network change procedure 202. These commands may rollback changes one at time and determine if the rollback placed the network in a safe state. In another embodiment, the rollback commands 714 may undo more than one change to place the network in a safe state. For example, the command may undo several changes before pausing to determine the impact of the roll back command 714.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or operations to be performed on the computer or other programmable apparatus to produce a computer-implemented process such that the instructions that execute on the computer or other programmable apparatus provide elements or operations for implementing the functions specified in the flow diagram block or blocks.

Accordingly, blocks of the block diagrams and flow diagrams support combinations of means for performing the specified functions, combinations of elements or operations for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or operations, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A system, comprising:
    at least one memory storing computer-executable instructions;
    at least one processor configured to execute the computer-executable instructions to:
        generate a network change procedure associated with devices on a network, wherein the network change procedure comprises a plurality of network changes to be implemented on at least one device of the devices;
        implement at least a first portion of the plurality of network changes on the at least one device;
        determine an impact of the at least a first portion of the plurality of network changes on a performance of the network, wherein the determination comprises comparing the performance of the network to a threshold value;
        determine that the performance of the network is less than the threshold value and undo the implementation of at least one of the at least the first portion of the plurality of network changes;
        determine that the performance of the network is greater than the threshold value after undoing the implementation of the at least one of the at least the first portion of the plurality of network changes; and
        in response to determining that the performance of the network is greater than the threshold value, re-implementing a network change of the at least one of the at least the first portion of the plurality of network changes that was previously undone.

2. The system of claim 1, the at least one processor further configured to:
    determine a number of the at least a portion of the plurality of network changes for which to undo the implementation, the determination of the number based at least in part on the comparison between the performance of the network and the threshold value.

3. The system of claim 1, the at least one processor further configured to execute the computer-executable instructions to:
    select pre-approved operations from a library of pre-approved operations that enable changes to one or more of the devices on the network; and
    select a pre-approved sequence for the pre-approved operations, wherein the generation of the network change procedure is based at least in part on the pre-approved sequence.

4. The system of claim 1, the at least one processor further configured to execute the computer-executable instructions to:
    determine to implement the network change procedure based at least in part on the network change procedure being compatible with one or more of the devices on the network.

5. The system of claim 1, wherein the at least a first portion of the plurality of network changes is implemented based at least in part on network status information, the network status information comprising a verification of an availability of the devices to implement the network change procedure.

6. The system of claim 5, wherein the availability comprises a period of time to implement the network change procedure in its entirety.

7. The system of claim 1, wherein the impact of the first portion of the plurality of network changes is based at least in part on performance information associated with the devices or the network.

8. A system comprising:
    at least one memory storing computer-executable instructions;
    at least one processor configured to access the at least one memory and execute the computer-executable instructions to:
        generate a network change procedure for devices on a network, the network change procedure comprising a plurality of changes to be implemented on the devices;
        determine that the network change procedure is compatible with the devices based at least in part on a configuration of the devices and the plurality of changes to be implemented on the devices;
        determine that the network is in a state that allows implementing the network change procedure and a time period that the network will remain in the state;
        determine a number of network changes of the plurality of network changes to implement based at least in part on the time period;
        cause the network changes corresponding to the number to be deployed to the devices on the network; and
        determine an impact of the network changes on the network.

9. The system of claim 8, the at least one processor further configured to:

determine at least one network change of the plurality of network changes that was not implemented during the time period; and cause the at least one network change to be deployed to the devices after the time period has elapsed.

10. The system of claim 9, the at least one processor further configured to:

cause the at least one network change to be deployed to the devices based at least in part on the impact of the number of network changes on the network.

11. The system of claim 8, the at least one processor further configured to:

record event logs associated with the devices and the network following the network changes; and determine the impact of the network changes based at least in part on the event logs.

12. The system of claim 8, wherein generating the network change procedure comprises:

selecting first pre-approved scripts from a library of pre-approved scripts for making the number of network changes on the devices;

arranging the first pre-approved scripts associated with the number of network changes into a first pre-approved sequence;

selecting second pre-approved scripts from a library of pre-approved scripts for making the at least one network change on the devices; and arranging the second pre-approved scripts associated with the at least one network change into a second pre-approved sequence.

13. The system of claim 8, wherein the devices comprise at least one of a managed router, an unmanaged router, a network switch, an access point, a firewall device, a gateway device, a bridge, a hub, or a repeater.

14. A method comprising:

generating, by at least one server comprising at least one processor, a network change procedure for devices on a network, the network change procedure comprising a plurality of changes to be implemented on the devices;

determining, by the at least one server, that the network change procedure is compatible with the devices based at least in part on a configuration of the devices and the plurality of changes to be implemented on the devices;

determining, by the at least one server, that the network is in a state that allows implementing the network change procedure and a time period that the network will remain in the state;

determining, by the at least one server, a number of network changes of the plurality of network changes to implement based at least in part on the time period;

causing, by the at least one server, the network changes corresponding to the number to be deployed to the devices on the network; and determining, by the at least one server, an impact of the network changes on the network.

15. The method of claim 14, further comprising:

determining, by the at least one server, at least one network change of the plurality of network changes that was not implemented during the time period; and causing, by the at least one server, the at least one network change to be deployed to the devices after the time period has elapsed.

16. The method of claim 15, further comprising:

causing, by the at least one server, the at least one network change to be deployed to the devices based at least in part on the impact of the number of network changes on the network.

17. The method of claim 14, further comprising:

recording, by the at least one server, event logs associated with the devices and the network following the network changes; and determining, by the at least one server, the impact of the network changes based at least in part on the event logs.

18. The method of claim 14, further comprising:

selecting, by the at least one server, first pre-approved scripts from a library of pre-approved scripts for making the number of network changes on the devices;

arranging, by the at least one server, the first pre-approved scripts associated with the number of network changes into a first pre-approved sequence;

selecting, by the at least one server, second pre-approved scripts from a library of pre-approved scripts for making the at least one network change on the devices; and arranging, by the at least one server, the second pre-approved scripts associated with the at least one network change into a second pre-approved sequence.

19. The method of claim 14, wherein the devices comprise at least one of a managed router, an unmanaged router, a network switch, an access point, a firewall device, a gateway device, a bridge, a hub, or a repeater.

* * * * *